United States Patent [19]  [11]  4,276,313
Rose  [45]  * Jun. 30, 1981

[54] PROCESS FOR PREPARING MEAT PRODUCTS HAVING REDUCED SHRINKAGE

[76] Inventor: Peter W. Rose, R.R. 3 Covered Bridge Rd., S. Barrington, Ill. 60010

[*] Notice: The portion of the term of this patent subsequent to Apr. 28, 1998, has been disclaimed.

[21] Appl. No.: 165,850

[22] Filed: Jul. 7, 1980

Related U.S. Application Data

[63] Continuation-in-part of Ser. No. 139,795, Apr. 14, 1980, which is a continuation-in-part of Ser. No. 129,727, Mar. 12, 1980.

[51] Int. Cl.³ .............................. A23B 4/02; A23L 3/32
[52] U.S. Cl. ..................................... 426/247; 204/131; 426/244; 426/246; 426/264; 426/281; 426/282; 426/413; 426/646; 426/652
[58] Field of Search ............... 426/129, 237, 244, 282, 426/284, 641, 646, 649, 652, 413, 518, 519, 246, 247, 264, 281; 204/98, 131

[56] References Cited

U.S. PATENT DOCUMENTS

| | | | |
|---|---|---|---|
| 267,684 | 11/1882 | Fowler | 426/246 |
| 657,258 | 9/1900 | Washburn | 426/246 |
| 705,367 | 7/1902 | Lincoln | 426/246 X |
| 760,173 | 5/1904 | Ball | 426/246 |
| 930,772 | 8/1909 | Lincoln | 426/246 |
| 1,044,201 | 11/1912 | Lincoln | 426/237 |

*Primary Examiner*—Arthur L. Corbin
*Attorney, Agent, or Firm*—Dressler, Goldsmith, Shore, Sutker & Milnamow, Ltd.

[57] ABSTRACT

Meat having minimal shrinkage upon cooking is prepared by treating meat with an aqueous solution of an edible chloride salt present at at least about 0.2 molal. The solution is first electrolyzed by passage of a direct current through said solution until at least 25 coulombs per liter of solution have passed therethrough. The meat and electrolyzed solution are then combined and maintained in contact until moisturized meat is formed, and the moisturized meat then recovered. The minimally shrinkage meat food product and an apparatus for its production are also disclosed.

48 Claims, 1 Drawing Figure

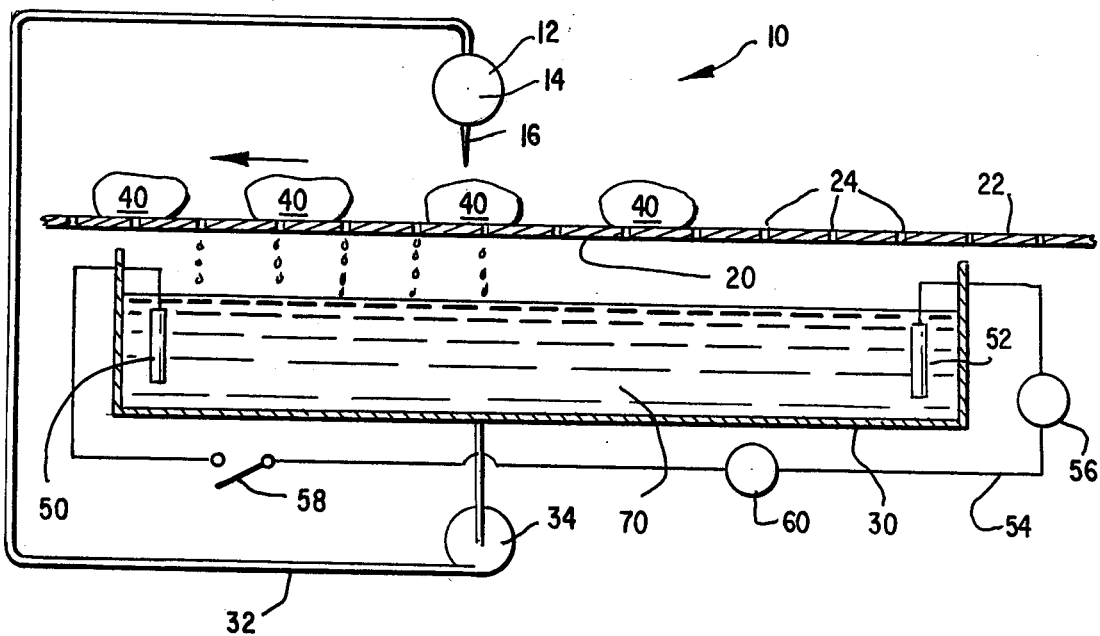

PROCESS FOR PREPARING MEAT PRODUCTS HAVING REDUCED SHRINKAGE

DESCRIPTION

1. Cross-Reference to Related Applications

This is a continuation-in-part of copending patent application Ser. No. 139,795, filed on Apr. 14, 1980 which, in turn, is a continuation-in-part of copending patent application Ser. No. 129,727, filed on Mar. 12, 1980.

2. Technical Field

The present invention relates to meat food products having reduced shrinkage upon processing, particularly after cooking, and to a process and apparatus for the preparation of such products.

3. Background Art

Water constitutes the largest portion, by weight, of a food animal. From about the time such an animal is slaughtered, its carcass begins to lose water, dry out or shrink. Shrinkage or weight loss, which begins on slaughtering, continues not only through the refrigeration and butchering steps in meat processing, but also during cooking. As a result of shrinkage, the meat generally becomes somewhat tougher and can be harder to butcher. As a further result of this shrinkage, the meat provider obtains a lesser amount of product to sell, and that product is of diminished quality. Because of shrinkage, the meat purchaser receives an even smaller amount of product to cook, and cooking shrinkage results in a still smaller amount of cooked material served for ultimate consumption.

Several processes are known in the art which are said to minimize or reverse carcass shrinkage. Among these are processes in which meat is sprayed or fogged with an aqueous solution, or in which meat is dipped into a water bath. In addition, it is well known to use aqueous curing compositions or pickles which assist in reducing meat shrinkage while preserving and flavoring the meat.

In some anti-shrink techniques in which water is added back to the carcass, or its meat, to return the water content to a natural level, it is found that such water is usually not held firmly therein and is lost again on processing. For example, it is known and usual in pork sausage manufacture to mix 1,000 pounds of pork chunks with up to 31 pounds of a brine solution containing 30 pounds of water and one pound of salt (sodium chloride). About one minute or more may be required for the pork chunks to become moisturized by sorbing the brine. Then, during further processing, when the moisturized pork chunks are ground, shrinkage again is manifest in that some water is lost from the ground, moisturized chunks, thereby lowering the yield of ground meat produced. When sausages containing 60 weight-% lean—40 weight-% fat ground pork are prepared by this known and usual method, and are cooked with continual rolling at a temperature of about 340°–350° F. for 10 minutes under standard conditions, it is observed that they shrink to about 38–43% of their precooked weight, or maintain about 62–57% of that weight. In addition, air pockets are often noted between the sausage casing and the meat therewithin, and the sausages curl.

In the curing arts, meats, particularly certain cuts of beef and pork, are cured by contacting the meat with aqueous curing solutions or dispersions, and maintaining that contact for a time sufficient to cure the meat. Methods for contacting the meat with aqueous curing solutions called aqueous pickle solutions or pickles include bathing the meat by total or partial submersion in the pickle, injecting the pickle into the meat through available indigenous vasculature, or by injecting the pickle into the meat through hollow needles that penetrate through the meat's surface. Each of these methods is frequently used alone, but more frequently, one or more of the aforementioned methods is used in conjunction with the others. In most common practice, pickle is injected into the meat at random locations, and the meat bathed with pickle by submersion therein. Bathing by submersion alone, or injection via available veins or arteries, are usually too inefficient for today's productivity requirements.

Aqueous pickle solutions are primarily composed of water to which salts, flavorants and preservatives are added. Thus, aqueous pickle solutions may contain edible chlorides such as sodium, potassium or calcium chloride, edible phosphates such as sodium pyrophosphate, tripolyphosphate, hexametaphosphate, disodium phosphate and the like, sugars such as sucrose, spices, edible gums, smoke distillates, and the like, as well as preservatives such as sodium nitrate and sodium nitrite.

Examination of pickling compositions known in the art reveals that polyvalent curing and buffering agents such as phosphate and carbonate salts frequently constitute an important portion of the pickle solution. The ranking by weight of importance of these salts in typical aqueous pickle solutions is normally third or fourth, after water, an edible chloride salt such as sodium chloride and a sugar such as sucrose or corn syrup. This is shown in U.S. Pat. Nos. 2,812,262; 3,028,246; 3,076,713; 3,215,540; 3,240,612 and 3,255,023.

One major problem with curing and preserving meat is shrinkage, since on going from its fresh state to the cured, cooked condition, the meat loses moisture, protein and fats. Shrinkage of about 25–30% of the original, fresh weight is a common result for cured products after they are smoked and cooked. Thus, relative to the fresh product, the meat supplier again has less meat to sell, and the purchaser again has less meat to buy.

One of the principal purposes for the inclusion of phosphates, carbonates and similar polyvalent curing and buffering agents in aqueous pickle solutions is to help prevent shrinkage in the cured, cooked products. This expedient is taught in U.S. Pat. No. 3,028,246 and U.S. Pat. No. 3,215,540. For example, these patents teach that yields of cooked products cured with phosphate salt-containing pickle solutions may range from near 90% to greater than 100% by weight of the freshly deboned meat.

It should, therefore, be beneficial to the meat product suppliers and the consuming public if shrinkage were reduced in meat products as sold and as used after cooking. It would also be beneficial if cured meat products could be produced in greater yield using pickle solutions similar to those already in use, or even at currently achievable yields, but by using pickle solutions from which some of the usual ingredients, such as phosphate salts, are omitted.

SUMMARY OF THE INVENTION

According to the present invention, a meat food product with reduced shrinkage is prepared by treating meat with an edible chloride salt-containing solution which has been electrolyzed by passage of direct current therethrough. By reduced shrinkage, it is meant that the meat loses a smaller amount of weight during processing and/or cooking than is usual at these steps. The treatment entails the steps of providing meat and providing an aqueous solution containing an edible chloride salt present at a concentration of at least about 0.2 molal (0.2 moles per 1000 grams of liquid water). A direct electric current is passed through the aqueous solution at about 2 to about 20 amperes and until at least about 25 coulombs per liter of solution have passed therethrough to form an electrolyzed solution. The meat and the electrolyzed solution are combined to contact the meat with the solution and form an admixture within about 40 minutes after passage of direct current through the electrolyzed solution has ceased. Contact between the meat supply and electrolyzed solution is maintained for a time period sufficient for the electrolyzed solution to penetrate the meat, enhancing the moisture content thereof and forming moisturized meat. The moisturized meat is then recovered.

The present invention has been practiced with or without inorganic phosphate enhancement for the meat. A boned meat food product of this invention having reduced shrinkage on cooking and which is free from inorganic phosphate enhancement measured as phosphoric acid, gains at least about 10 weight percent of its boned weight when 20 pounds of boned meat are heated to an internal temperature of about 150° F. and maintained at that temperature for about one hour.

Another boned, cured, cooked and smoked meat food product of this invention having reduced shrinkage on cooking and an enhanced level of inorganic phosphate, measured as phosphoric acid, gains at least about 2 weight percent more than a previously known food product cured with an inorganic phosphate-containing curing solution, when 20 pounds of boned meat are heated and smoked to an internal temperature of about 150° F. and maintained at that temperature for about one hour.

An improved apparatus for treating meat is also disclosed. This apparatus includes means for supporting the meat, means for injecting an aqueous meat treating solution into meat movably positioned above the meat support means, and a reservoir means for the aqueous meat treating solution which communicates with the liquid injecting means. The improvement in this apparatus includes a pair of spaced electrodes situated within the reservoir and capable of delivering a current concentration of at least about 0.001 amperes per liter of the solution within the reservoir, and a direct electric current source operably associated with the spaced electrodes to pass current through the solution.

One advantage of the instant process is that when meat is moisturized to a water content similar to that of its natural level, water within the meat tends to become more firmly bound and tends to be retained during subsequent processing, thereby improving the yield of ground meat by reducing processing shrinkage.

Another advantage of the process of this invention is that when the ground product is cooked, as when it is made into sausages, the yield of cooked sausage made by the process of this invention may be greater than is the cooked yield of usually made sausage, thus evidencing a reduction of cooking shrinkage.

Still another advantage of this invention is that the difference in cooked yield between sausages made according to this invention and sausages made in the usual manner may be greater in weight than the weight of water or other ingredients added to the meat during processing.

Yet another advantage of this invention is that sausages made in accordance with its process aspects are found to be more tender than sausages prepared in the usual manner.

Another benefit of the present invention is that shrinkage in cured, cooked meat products may be substantially reduced without resort to the use of phosphate, carbonate or other polyvalent pickling and buffering agents in the aqueous pickle solution.

Yet another benefit of this invention is that even when phosphate salts are used in the aqueous pickle solution, substantially better cooked yields may be obtained with the electrolyzed, phosphate-containing compositions of the present invention than with similar, non-electrolyzed phosphate-containing compositions.

Still another feature of the present invention is that recycled pickle prepared and used in accordance with this invention tends to remain in a usable condition for a longer period of time.

Numerous other advantages and features of the present invention will become readily apparent from the following detailed description of the invention and embodiments thereof, and from the claims.

BRIEF DESCRIPTION OF THE DRAWING

In the accompanying drawing, forming a part of the specification, the sole FIGURE is a schematic representation, partially in section, of an apparatus of this invention.

DETAILED DESCRIPTION OF THE INVENTION

When practicing the present invention, the reduction in weight loss is manifest in all three dimensions of the meat subjected to treatment. As a consequence, the meat tends to retain its size and shape during processing, and more particularly during cooking. The process of this invention may be used to prepare both fresh and cured edible products having reduced shrinkage.

The process of this invention can be practiced with the meat from a wide variety of animals. As used herein, the term "meat" includes the flesh of domestic and wild mammals, such as beef, pork, veal, venison, buffalo, and the like. In preferred practice, this flesh is pork or beef.

Pork will be used illustratively herein as it is a meat of great commercial importance. In addition, pork is also a useful exemplary meat inasmuch as pork products are sold fresh as well as cured and cooked, and in large cuts or as ground products.

An aqueous solution of an edible chloride salt such as sodium chloride or potassium chloride or calcium chloride is utilized in the present process. Sodium chloride is the preferred salt. It is to be understood, however, that in the examples hereinbelow where sodium chloride is used as the edible salt, other edible salts can be substituted without adversely affecting the result.

An aqueous solution concentration of at least about 0.2 molal edible chloride salt to about a saturated solution of the edible chloride salt may be used in the present invention. More preferred concentrations of edible chloride salt will be discussed hereinbelow in conjunction with specifically discussed embodiments.

A direct electric current is passed through the aqueous, edible chloride salt solution to form an electrolyzed solution. A current of about 2 to about 20 amperes is passed through the solution for a period of time sufficient to pass therethrough at least about 25 coulombs per liter of solution, and preferably at least about 50 coulombs per liter of solution. Usually about 300 coulombs per liter of aqueous sodium chloride solution represents a practical upper limit inasmuch as additional current passage confers little, if any, further benefit.

After formation of the electrolyzed solution, that solution is combined with the meat to contact one with the other. Several modes of combining meat and aqueous solution are known in the art, and illustratively include, among others, bathing the meat by total or partial submersion of large cuts, such as a loin, in the solution, spraying, splashing or dipping the meat in the solution, injection of solution into the meat via the indigenous vasculature, by piercing the meat with hollow needles and injecting the aqueous solution through the needles and into the meat, and simply physically mixing chunks of meat with an amount of the solution.

It is found that the electrolyzed solution should be used within about 40 minutes after its formation. In more preferred practice, the electrolyzed solution is used within about 15 minutes of its formation. Most preferably, this solution is used within about 5 minutes of its formation. In addition to specific times within which to use this solution, additional bench marks for when the solution may be used have been found, and these are discussed hereinafter.

Contact between the meat and aqueous sodium chloride solution is maintained for a time sufficient to form moisturized meat. Moisturized meat is meat whose moisture content is enhanced over that naturally present. The amount of moisture enhancement may vary widely among the various meat food products produced by the process of this invention. The time period of contact may also have a broad range before the next process step such as recovery, grinding, curing or the like is initiated. For example, the contacting time period may be a matter of minutes, as when ground meat product is prepared, to one or more days when cured meats are prepared.

After the meat is moisturized and further processed as desired, it is recovered for use. For example, the moisturized meat may be packaged and sold as such, ground to form the basis for various sausages, allowed to cure for a requisite time before being cooked, smoked, or sold in a cured form only, or the like.

In one embodiment of the process of the present invention, ground meat having reduced shrinkage is prepared. As stated hereinbefore, pork will be used as exemplary of the meat used in the process.

The pork used for grinding is frequently prepared from meat trimmings obtained by butchering various cuts of meat. When used in the instant process, a supply of this meat is provided in the form of chunks which are preferably about 1 to about 5 inches on a side. Larger chunks may be also used, such as those pieces up to about 8 inches or more on a side. Additionally, smaller chunks may also be used, such as roughly ground meat like that which has been ground through a grinding face plate having about ⅜ inch apertures.

The edible chloride salt is preferably present in the aqueous solution of this embodiment at a concentration of about 0.25 to about 1.25 molal. Converting molalities to percentages by weight of sodium chloride, about 1% by weight of aqueous solution to a saturated sodium chloride are useful concentrations herein, while use of sodium chloride in an amount of about 1.5% to about 5% by weight of the aqueous solution is preferred.

Another way to characterize the desired edible chloride salt concentration is as a function of the weight of meat treated. Thus, it is found that a concentration of about 0.05% to about 0.4% by weight of the total meat supplied in the process is suitable. An exemplary concentration of sodium chloride present in the aqueous solution useful in this invention is about 0.1% by weight of the total meat supplied in the process.

A small amount of a sugar such as sucrose or other flavorant may also be present in the aqueous solution at a concentration sufficient to mask the flavor of the edible chloride salt. A useful amount of sucrose for this purpose has been found to be about 0.01% by weight of the total meat supplied.

For the instant embodiment, the amperage of the direct electric current passed through the aqueous solution of edible chloride salt, while being broadly about 2 to about 20 amperes in this embodiment, is preferably about 5 to about 15 amperes, and more preferably about 5 to about 10 amperes. The voltage during electrolysis may be about 1 to about 20 volts, and is preferably less than about 5 volts.

Three criteria have been found useful for determining the duration of direct current passage through the aqueous solution to form the electrolyzed solution. The first of these criteria is the previously stated broad criterion that electrolysis is continued until at least a minimal number of coulombs have passed per liter of solution. Another criterion is based upon the retention performance of the electrolyzed solution after combination with the meat chunks. The third criterion includes the measurement of a change in pH value of the aqueous solution upon electrolysis.

Thus, as above stated, electrolysis using about 2 to about 20 amperes may be continued until at least about 25 coulombs have passed per liter of solution. More preferably, electrolysis is continued until at least 50 coulombs per liter have passed therethrough.

Using the second criterion, an exemplary sodium chloride solution may be electrolyzed at least until the time at which at least about 50 percent by weight of the electrolyzed solution, when combined with the meat chunks at about 3 percent by weight of those meat chunks, is retained after those meat chunks are ground. Stated slightly differently, current is passed through the solution in an amount to provide an electrolyzed solution at least one-half of which is retained by the meat chunks after grinding when the electrolyzed solution is combined with the meat chunks before grinding in an amount of about 3 percent by weight thereof. In more preferred practice, passage of current through the solution is continued until about 60% to about 80% by weight, and most preferably greater than about 80% by weight of the electrolyzed solution, when combined with the meat chunks at about 3% by weight of the meat chunks, is retained after the meat chunks are ground.

Aqueous edible chloride salt solutions useful in the preparation of ground meat products may also contain a variety of ingredients including buffering and polyvalent pickling agents such as various carbonate and phosphate salts, like sodium bicarbonate, sodium hexametaphosphate and sodium pyrophosphate. When buffering agents are present, the hereinabove described characterizations of the duration of electrolysis are useful methods for determining the duration of the current passage. However, when there is substantially no buffering capacity in the aqueous edible chloride salt solution, as in a solution of tap water saturated with sodium chloride, the third criterion for the duration direct electric current passage may be used. By this criterion, direct electric current may be passed through the solution until the pH of the electrolyzed solution has at least a value of about 8. In more preferred practice, passage of the direct current (electrolysis) is continued until a pH value of about 8.5 to about 10.5 for the aqueous edible chloride salt solution is achieved.

An aqueous solution of edible chloride salt normally has a near neutral pH value. For example, the aqueous sodium chloride solution may have a pH value of about 6.5 to about 7.7, prior to the passage of current therethrough when prepared from City of Chicago tap water.

The rise in pH value for the salt solution is only temporary, and the electrolyzed solution should be used while the pH value thereof remains elevated. For example, for a solution containing about 3.8% by weight sodium chloride, the pH value begins to fall back towards its original value about 15 minutes after the direct current passing therethrough is shut off. This solution reverts to about its original pH value after about 40 minutes from the time the direct current is shut off. Thus, the electrolyzed solution is preferably combined with the meat within about 40 minutes after passage of the electric current ceases.

Using a performance criterion, it is preferred that the electrolyzed solution be combined with the meat chunks while at least about one-half by weight of the electrolyzed solution, when combined with the meat chunks at about 3% by weight of the meat chunks, is retained after the meat chunks are ground. Stating this criterion in a slightly different manner, the meat chunks and electrolyzed solution are combined to form an admixture while at least about one-half of the electrolyzed solution is retained by meat chunks after grinding when that solution is combined with the meat chunks before grinding in an amount of 3 percent by weight thereof. More preferably, the electrolyzed solution is combined with the meat chunks while about 60% to about 80% by weight, and most preferably more than about 80% by weight of the combined, electrolyzed solution is, when combined with the meat chunks at about 3% by weight of the meat chunks, retained after the meat chunks are ground.

Using a criterion similar to that for the duration of electrolysis for electrolyzed solutions having substantially no buffering capacity, the edible chloride salt solution is preferably combined with the meat chunks while the pH value of the solution is at least about 8. More preferably, the electrolyzed edible chloride salt solution is combined with the meat chunks while the pH value of the solution is about 8.5 to about 10.5.

Electrodes for use in the present process may be selected from a wide variety of conductive but relatively non-consumable materials such as carbon, graphite, silver, or stainless steel, or the like In one suitable arrangement, a stainless steel pan containing the edible chloride salt solution may be used as the anode while a carbon electrode suspended within the solution in the pan may be the cathode; alternatively the pan may be made the cathode and the carbon electrode the anode.

It has been found preferable that the edible chloride salt solution whose pH value has been raised to at least about 8 be at a temperature of about 100° F. to about 130° F., and more preferably at about 110° F., after passage therethrough of the direct electric current and when it is combined with the meat chunks, as discussed hereinbelow. Since the addition of this heated solution tends to raise the temperature of the otherwise normally chilled meat chunks, comminuted ice may also be admixed with the meat chunks and edible chloride salt solution to assist in keeping the meat chunks chilled.

The electrolyzed solution is taken-up by the meat more rapidly if the solution is heated. However, sanitary reasons and good practice require that the meat be kept chilled. Thus, the heated, electrolyzed solution is usually first combined with the meat and allowed to be taken-up thereby, and then ice is added to return the meat toward the temperature it possessed prior to the addition of the heated solution. Since the electrolyzed solution is usually taken-up within about one minute, and the ice added quickly thereafter, little heating of the meat usually occurs. The ice and edible chloride salt solution are together referred to herein as the aqueous portion. Various means of heating water are well known in the art, and hot tap water may be used.

To prepare a ground meat product of this embodiment, the meat chunks, the electrolyzed solution of tap water and edible chloride salt and ice particles (when used) are combined together to form an admixture. A conventional mixing means such as a paddle mixer or ribbon mixer or the like, as are known in the industry, may be used. the admixture is agitated until at least a portion of the electrolyzed solution is taken-up or sorbed by the meat chunks to form moisturized meat chunks. For example, this take-up takes less than about 1 minute and frequently less than ½ minute of agitation time for an aqueous solution containing 3% water and 0.1% sodium chloride, both based on the total weight of meat supplied. The word "sorb" as used herein in its various grammatical forms is meant to include both the terms absorb and adsorb.

When making ground meats having a high fat content, such as the common 60 weight-% lean—40 weight-% fat pork sausage, it is preferred to first combine with the aqueous portion and agitate the leaner meat chunks, such as those containing no more than about 8% to about 10% fat by weight and termed in the art as super lean. Once the aqueous portion has penetrated the meat that is present, a second supply of meat chunks having a higher fat content by weight may be admixed therewith to form a second meat chunk admixture.

After all of the meat and electrolyzed aqueous solution have been admixed, the composition, whether moisturized meat chunks or second meat chunk admixture, is ground to form a product. It is found when the process of this invention is followed in the production of 60 weight-% lean—40 weight-% fat pork sausages using an electrolyzed solution containing sodium chloride at 0.1% by weight of the meat chunks admixed with meat chunks at about 3% by weight of those meat chunks, that little or no water is lost during the grinding step, thus demonstrating shrinkage reduction during processing. This is contrary to the usual occurrence when this type of sausage is made with the same amount of moisturizing water and sodium chloride per pound of meat, and was quite startling when first observed.

In another embodiment of this process, the combining of the meat chunks with the electrolyzed aqueous edible chloride salt solution to form an admixture, the agitation of the admixture to form moisturized meat chunks and the grinding of the moisturized meat chunks may all be carried out together. For example, the meat chunks may be placed into a grinder and the electrolyzed solution added during the grinding step so that the electrolyzed solution is admixed, agitated with and sorbed or taken-up by the meat while the meat is being comminuted and mixed within the grinder.

After grinding, the ground product is recovered. If sausages are made, the ground meat is stuffed into sausage casings, such as those made from processed collagen, and the stuffed casings are bound or knotted to form sausage links or large sausages, as is known in the art.

Ground meat products used in sausages also usually contains added spices. In preferred practice herein, spices are added to the meat prior to the grinding step as this helps assure a uniform distribution of the spices.

The ground meat prepared in accordance with this invention may be marketed in a pre-cooked state; i.e., sausages may be at least partially cooked prior to sale, as is the situation for the sausage of Example 2, hereinbelow. The process steps used in the preparation of a pre-cooked, ground meat product may be similar to those for a fresh, ground meat product with the addition of cooking and possibly packaging steps.

Cured meat is prepared in another embodiment of the process of this invention. Pork is again used as exemplary of meat.

In the curing arts, the aqueous edible chloride salt-containing solution used in preparing cured meats is called a pickle or aqueous pickle solution. In this embodiment, the aqueous pickle solution contains at least about 0.4 molal edible chloride salt such as sodium chloride. In more preferred practice, the edible chloride salt is used at a concentration of about 0.6 molal to about 1.5 molal. The upper limit for the concentration of edible chloride salt is saturation of the aqueous pickle solution.

In preferred practice, the aqueous pickle solutions of the present invention may also contain polyvalent pickling and buffering agents. These materials include inorganic phosphate salts such as sodium tripolyphosphate, sodium pyrophosphate, sodium hexametaphosphate, sodium mono- and dibasic phosphates and the like. Additional agents such as citric acid or its sodium salts, or sodium carbonate or bicarbonate, glutamic acid and its salts, the salts of ethylenediamine tetraacetic acid, and the like may be present. Spices, gums, smoke flavorants such as wood distillates, and the like, as are well known in the meat curing art, may also comprise the aqueous pickle solutions of this invention.

In most preferred practice, the aqueous pickle solutions of the present invention contain no added phosphates, carbonates or other polyvalent pickling agents; i.e. the most preferred aqueous pickle solutions are substantially free of polyvalent pickling agents, or buffers. Rather, the most preferred aqueous pickle solutions comprise water (usually tap water), an edible chloride salt, such as sodium chloride, as well as sodium nitrate and/or sodium nitrite and sugars suchas sucrose or corn syrup; i.e. those materials normally found in an aqueous pickle solution other than the polyvalent buffering and pickling agents such as phosphate or carbonate salts or the like.

In addition to the above-mentioned aqueous pickle solution components, aqueous pickle solutions of this invention may also contain edible acids and bases to control the pH value of the composition. These edible acids and bases include hydrochloric acid, acetic acid, sodium hydroxide and the like. Of course, the above-mentioned, or similar, phosphate salts and citric acid and its mono-, di- and trisodium salts may also be used to assist in controlling the pH value of the aqueous pickle solution.

Except for the before discussed concentrations of edible chloride salt, particular pickle solutions formulations are not a feature of this invention.

In preferred practice, the aqueous pickle solution has a pH value of about 8 to about 11. When phosphate salts or other polyvalent pickling agents are present in the aqueous pickle solution, the preferred pH value of the aqueous pickle solution is about 9.5 to about 10.5. In more preferred practice, where the aqueous pickle solution is substantially free of these buffering agents, (has about the buffering capacity of a solution of tap water saturated with sodium chloride) the pH value of the electrolyzed aqueous pickle solution, as used to contact meat for curing, is at least about 8, and still more preferably is about 8.5 to about 10.5.

Meat to be cured is contacted with the aqueous pickle solution for a time sufficient to effect cure, as is well known in the art. However, prior to such contacting, the aqueous pickle solution of this invention is formed into a electrolyzed aqueous pickle solution by passing a direct electric current of about 2 to about 20 amperes, and preferably about 3 to about 8 amperes therethrough for a period of time sufficient to pass at least about 25 coulombs per liter of aqueous pickle solution. Preferably, at least about 50 coulombs per liter of aqueous pickle solution are passed therethrough. It is found that the voltage values at which these direct electric currents are passed may vary over a considerable range, presumably depending upon the amount of electrolyte present in particular aqueous pickle solutions, and the range of usually observed voltages is that stated hereinbefore.

The aqueous pickle solutions are preferably electrolyzed at the before-described edible chloride salt concentrations for this embodiment, although electrolysis at one concentration may be followed by adjustment of that concentration. For example, a more concentrated sodium chloride solution may be electrolyzed at the above-described number of coulombs per liter of pickle, and the concentration of sodium chloride and other aqueous pickle solution ingredients then adjusted as desired. Regardless of the edible chloride salt concentration during electrolysis, when used to contact meat for curing, the electrolyzed, aqueous pickle solution contains at least about 0.4 molal edible chloride salt, and preferably about 0.6 molal to about 1.5 molal edible chloride salt.

The electrolyzed aqueous pickle solutions are preferably utilized within about 40 minutes after electrolysis has ceased as it is found that the electrolyzed, aqueous pickle solutions tend to lose their effectiveness after about this duration. More preferably, these solutions are utilized within about 15 minutes after electrolysis has ceased, and most preferably, they are utilized within about 5 minutes from the time the passage of direct current through the pickle solution is stopped.

When the aqueous pickle solution is substantially free of polyvalent pickling and buffering agents, the time for its use may be determined by pH value of the electrolyzed pickle solution. Thus, the electrolyzed pickle solution is preferably used to contact the meat while the solution pH value is at least about 8, and more preferably while the solution pH value is about 8.5 to about 10.5.

Contacting of the meat and aqueous pickle solution may be effected in various ways as discussed hereinbefore. In most preferred practice, the meat is contacted with the electrolyzed aqueous pickle solution by injecting the solution into the meat through a plurality of hollow needles. When using this technique, the electrolyzed aqueous pickle solution which usually exudes from the meat after injection and that which normally drips from the injection needles is recycled for injection into other pieces of meat. The meat may also be injected with the electrolyzed aqueous pickle solution more than one time.

When using the recycling, pickle solution-injecting technique with usually used, non-electrolyzed phosphate salt-containing aqueous pickle solutions, two phenomena are noted about the pickle solution. First, the pickle solution becomes reddish in color, presumably due to the leaching of heme-containing proteins from the meat. Second, the pH value of the aqueous pickle solution drops from an initial value of greater than about pH 9 to near neutral within about 30 to about 40 minutes of recycled use, presumably, because of neutralization of constituents within the meat and loss of the phosphate salts from the pickle solution to the meat. Both of the factors tend to shorten the pickle solution's useful life.

In using the electrolyzed aqueous pickle solutions according to the present invention, as described more fully hereinbelow, there is little if any color change in the pickle, nor is there a substantial decrease in the pH value of the pickle solution. Thus, the useful life of the electrolyzed aqueous pickle solutions of the present invention may be longer than the life of a conventional, non-electrolyzed pickle solution.

In preferred practice, the aqueous pickle solution is electrolyzed prior to being contacted with the meat to be cured. Several means for passing direct electric current through an aqueous solution are useful in the present invention, and some of these have been previously discussed. For example, the aqueous pickle solution may be placed into a stainless steel bucket, the bucket itself used as one electrode, such as the cathode, while another electrode, made from silver, graphite or other suitable material, is placed within the solution in the bucket as the anode. Applying direct electric current to these electrodes at a voltage sufficient to produce the before described amperage and number of coulombs per liter of pickle solution will then result in the formation of the electrolyzed, aqueous pickle solution utilized herein. The electrolyzed pickle solution so formed may then be injected into the meat to be cured. The polarity of these electrodes may, of course, also be reversed.

Another embodiment of this invention utiizes the improved apparatus for treating meat of this invention which is shown in the Figure, and generally designated therein by the numeral 10. The apparatus includes injection means 12 for introducing an aqueous meat treating solution into the meat. Injection means 12 normally includes a manifold 14 and a plurality of hollow needles 16 projecting therefrom and communicating with manifold 14. The meat treating solution 70, such as an aqueous pickle solution, may be injected into pieces of meat 40 by causing needles 16 to penetrate meat 40 and applying a pumping force to inject the solution into the meat.

The injection means 12 is movably positioned above a foraminous meat supporting member 20 which supports the meat 40 at least when the meat is being injected with the electrolyzed treating solution 70. This meat supporting member 20 is preferably part of a meat conveying assembly 22 which conveys meat to and from the injecting means 12.

When in use, the conveying assembly 22 carries the meat to a position beneath the needles 16. The injecting means 12, moving reciprocally, and preferably vertically, pierces the meat 40 with the needles 16 when moved in one direction; i.e., downwardly, while the meat 40 may pass without obstruction under the needles 16 when the needles 16 are retracted. By use of appropriate valving, the aqueous solution is injected into the meat, through the needles 16 only when the needles 16 pierce the meat 40.

A reservoir 30 for holding the aqueous meat treating solution is provided as part of the apparatus. In usual practice, the reservoir 30 contains the bulk of the treating solution as a portion of this solution is normally within the various pipes and additional conduits for conveying the solution to and from the meat injecting means 12, and of course, some of the solution is sorbed within the treated meat. In preferred practice, the reservoir 30 is positioned at a lower level than the injecting means 12, meat supporting member 20 and/or meat conveying assembly 22 so that any excess of the injected meat treating solution may by force flow of gravity into the reservoir 30 for recycling. The reservoir 30 is connected to the injecting means 12 by suitable piping 32 or the like for conducting the aqueous meat treating solution to the injecting means 12. A pump 34 may be utilized to transport the aqueous solution from the reservoir 30 to the injecting means 12.

In preferred practice, the aqueous meat treating solution which may exude from the meat after injection or which is in any other way in excess of that retained by the meat is returned to the reservoir 30 by appropriate return means for recycling. A plurality of apertures 24 in foraminous meat supporting member 20 provide one suitable means for returning the excess aqueous meat treating solution directly to the reservoir 30 for recycling. In another embodiment, not shown, a catch pan and conduit means may be used to provide suitable means for returning excess solution to the reservoir 30.

In addition to the above recited elements, the meat treating apparatus embodying the present invention also includes an assembly for electrolyzing an aqueous meat treating solution within the reservoir 30. The electrolyzing assembly includes a pair of electrodes 50 and 52 spaced apart and within the reservoir 30. Electrodes 50 and 52 are operably associated with a direct electric current source 56 by suitable circuitry 54, which may include an on-off switch 58 and a means 60 for monitoring and regulating the flow of direct electric current between the electrodes 50 and 52, e.g., an ammeter, a rheostat or both. The electrodes 50 and 52 may be made from suitable conductive materials as discussed hereinbefore.

It is understood in the present embodiment and in all of the previously discussed embodiments of this invention that while only two electrodes are mentioned, they are illustrative of the minimal requirement for electrodes, namely, a positive and negative electrode. Thus, in actual practice, a plurality of physical objects may correspond to each of electrodes 50 and 52 or any other electrodes discussed herein.

Electrodes 50 and 52 are configured so as to deliver direct current at a current concentration of at least about 0.001 amperes per liter of the solution in the reservoir. Preferably, the current concentration is about 0.002 to about 0.001 amperes per liter. The direct current source must of course be capable of supplying this amount of direct current.

The current passing capacity of the electrodes and the direct current source 56 may also be stated in terms of the coulombs per liter of meat treating solution being electrolyzed. Thus, at least about 25 coulombs per liter of solution and preferably at least about 50 coulombs per liter of solution should be capable of passage during electrolysis using a current of about 2 to about 20 amperes. The direct current power source 56 should have a maximum current delivery capacity of at least 20 amperes and a minimum capacity of at least about 0.5 amperes, as will be discussed hereinafter.

At least four methods have been found in which the apparatus of the invention may be used to carryout a process of this invention and prepare a product of this invention. The first of these methods is a batch process in which the aqueous pickle solution is electrolyzed, the current stopped and the electrolyzed solution then injected into the meat. In the second method, the solution is electrolyzed, and the electrolyzed solution withdrawn as needed with the direct current passage continuing at a lower amperage to thereby maintain the electrolyzed solution. Using the third method, the electrodes 50 and 52 are so positioned that solution entering the reservoir 30 at one position is electrolyzed sufficiently for use upon the solution's reaching the reservoir exit; the electrolyzed solution reaching the reservoir 30 exit by flow caused by withdrawal of the electrolyzed solution from the reservoir 30. Using the fourth technique, the solution is continually electrolyzed, electrolyzed solution withdrawn for use and new, non-electrolyzed solution added to the electrolyzed solution to replace the electrolyzed solution which is withdrawn.

In using the apparatus of this invention for a batch process, one may place the aqueous pickle solution to be electrolyzed within the reservoir 30 and pass direct electric current through the pickle solution to form the electrolyzed aqueous pickle solution as discussed hereinbefore. The electrolyzed aqueous pickle solution may then be pumped from the reservoir 30 to the injecting means 12 through pipe 32 with the assistance of the pump 34. The meat 40 to be cured, for example, may then be injected with the solution with excess solution 70 being returned to the reservoir 30 via a returning means, such as apertures 24. The electrolyzed solution would not be injected into the meat at a time greater than about 40 minutes after the direct current was shut-off.

In the above-mentioned second method, the electric current needed for formation of the electrolyzed pickle solution is first passed through the aqueous pickle solution 70 at a rate required to effect the electrolysis. Thereafter, the direct current is passed therethrough at a lowered amperage of about 0.5 to about 2 amperes to maintain the desired degree of electrolysis for the bulk of the aqueous pickle solution 70 in the reservoir 30 while part of the electrolyzed aqueous pickle solution is withdrawn from the reservoir and injected into the meat. Any excess pickle solution is collected back into the reservoir 30 for recycling through apertures 24 in the meat conveying apparatus 22.

The third above-mentioned electrolysis method might be termed a "pass through" procedure in that little back mixing occurs and the pickle solution is electrolyzed to the desired extent by the time it has passed through the reservoir 30. Hence, the reservoir 30 resembles a trough or conduit whose capacity need only be slightly larger than that needed to supply the injection means 12 with electrolyzed solution. As stated hereinbefore, the electrodes 50 and 52 are positioned within the reservoir 30 so that the required current passage may be effected through the solution during the solution's period of flow through the reservoir 30.

With the fourth technique, an additional passage of current is also utilized, but in this instance, the rate of additional current flow sufficient to convert newly added, non-electrolyzed pickle solution to electrolyzed pickle solution, rather than simply maintain an already prepared, electrolyzed pickle solution in an electrolyzed state. Excess, previously injected, electrolyzed pickle solution may also be recycled into the electrolyzing pickle solution.

Regardless of the method of preparing the electrolyzed pickle solution, once the electrolyzed pickle solution is formed, treatment of the meat takes place by first contacting the meat to be cured with the electrolyzed aqueous pickle solution. The meat and pickle solution are thereafter maintained in contact for a period of time sufficient to effect curing of the meat, and thereby produce moisturized, cured meat; i.e., meat having a moisture content enhanced over that moisture content naturally present, and which is also cured. The time to effect curing of the meat is, among others, a function of the particular pickle solution, curing temperature and the meat being cured, and all of this is known in the art.

When using the most preferred method of contacting the meat and pickle solution by injection of the pickle into the meat through hollow needles, it is of course understood that the needles normally do not remain within the meat except during the injection period, nor is the pickle solution continually injected into the meat. Rather, in usual practice, the needles pierce a portion of the meat, electrolyzed aqueous pickle solution is injected into the meat therethrough, the needles are retracted from the meat, and then pierce the same piece of meat at a different position, or pierce a new piece of meat, and the steps repeated. To increase the amount of aqueous pickle solution within the meat, each piece of meat may be so injected on more than one occasion.

The meat food products of this invention exhibit reduced shrinkage on cooking. The cured, smoked meats of this invention may be characterized, inter alia, by both their amount of shrinkage under specified conditions and also by their content of polyvalent pickling and buffering agents, principally as inorganic phosphate, measured as phosphoric acid.

One such boned, cured, smoked meat food product of this invention having reduced shrinkage on cooking and which is free from inorganic phosphate enhancement, measured as phosphoric acid. This product gains at least about 10 weight percent of its boned, green weight as measured after cooking. This weight gain determination is made using about 20 pounds of boned meat, such as pork loin moisturized with about 140–150 weight percent of its green, boned weight, as when injected with a pickle solution as previously described. The moisturized meat is then cured, cooked and smoked, to an internal temperature of about 150° F. and maintained at that temperature for about one hour. More preferably, the above described weight gain is at least about 15 weight percent of the meat's green, boned weight. Thus, after cooking, as described, one cured meat product of this invention would weigh at least about 110 percent of its green or boned weight, while a more preferenced cured meat product would weigh at least about 115 percent of its green or boned weight.

The edible chloride salt content of this meat, measured as sodium chloride, is suitably about 1.5 to about 4 weight percent, and preferably is about 2 to about 3.5 weight percent of the total uncooked weight. Thus, this uncooked meat food product has a concentration of inorganic phosphate of about that of an untreated piece of meat, while the concentration of edible chloride salt is enhanced.

Interestingly, these enhanced levels of edible chloride salt are achieved using about 30–40 weight percent less edible chloride salt in the curing composition than are normally present when phosphate salts are used to cure the composition. Yet, the amount of edible chloride salt introduced into the cured product is about the same using either type of curing composition. For example, following the process of this invention, about 400 pounds of sodium chloride may be used per 1100 gallons of aqueous pickle solution while about 600 pounds of sodium chloride in the same amount of pickle was needed to produce the above edible salt concentrations in the presence of phosphate salts present at about 2 weight precent of the pickle.

Another boned, cured, cooked and smoked meat product of this invention also has reduced shrinkage on cooking, but has an enhanced level of inorganic phosphate, measured as phosphoric acid. This product gains at least about 2 weight percent more, after cooking and smoking, than does a meat food product cured with previously known inorganic phosphate-containing curing solutions. As curing meat with inorganic phosphate-containing curing solutions is believed to produce the highest weight gains, it is believed that the inorganic phosphate enhanced meat food products of this invention also gain about 2 weight percent more, after cooking and smoking, than do any previously known meat food products. The weight gain determinations are made using 20 pounds of boned meat, moisturized with a curing composition in an amount equal to about 140-150 weight percent of the meat's green or boned weight. The moisturized meat is then cured, cooked and smoked to an internal temperature of about 150° F. and maintained at that temperature for about one hour. An example of this difference in meat food product weight gain is shown in Example 7, hereinbelow.

The edible chloride salt content of this meat, measured as sodium chloride, is suitably about 1.5 to about 4 weight percent, and preferably is about 2 to about 3.5 weight percent of the total uncooked weight. Thus, the levels of both inorganic phosphate and edible chloride salt are enhanced.

As all living matter contains inorganic phosphate, the levels of inorganic phosphate discussed hereinabove relate to the total concentrations of phosphate ions, expressed as phosphoric acid, which are present in the meat. Thus, the above values include the amounts of inorganic phosphate ions normally present in meat. Average values for normal levels of inorganic phosphates are readily available for meats of various animals, as well as particular meat cuts from particular animals. Correspondingly, meat products described as "free from inorganic phosphate enhancement" are those meat products containing only the naturally occurring amounts of inorganic phosphate.

Average concentrations of edible chloride salts, measured as sodium chloride, are also known for various meats and meat cuts. The values expressed hereinbefore as being contained in meat are enhanced over the usually found levels, and are also reported as the total amount found in the treated products.

The term "solution" is used herein to include true solutions, dispersions and mixtures of ingredients as are known in the art and to be useful for treating meats.

The amounts of various additives described and utilized herein are used only in an illustrative manner to demonstrate the advantages and benefits of this invention. The examples set forth hereinbelow illustrate the present invention further.

EXAMPLE 1: MANUFACTURE OF PORK SAUSAGE LINKS

Pork sausages (60 weight-% lean—40 weight-% fat) were prepared in two batches using equal amounts of total meat, water, sodium chloride, sugar and spice. For one batch of sausages, the usual process was followed, while for the other batch, the process of this invention was used.

Thus, a solution of 25 pounds of hot tap water containing sodium chloride (one pound) and sucrose (72 grams) was provided in a stainless steel pan. The pan was used as the anode and a carbon electrode was used as the cathode for passage of a direct electric current at 10 amperes and 15 volts through the solution. This current passage raised the pH value of the solution from about 6.5 to about 9 in about 5 minutes.

The solution, at a temperature of about 110° F., was then combined with 120 pounds of super lean pork chunks (9% fat by weight) with agitation. Ice particles (5 pounds) were added after take-up of the solution by the pork chunks and the resulting admixture was agitated further. The aqueous solution was taken-up by the meat within about 10 seconds from the time agitation began to form moisturized lean pork chunks. 880 Pounds of less lean pork chunks (having a higher fat content) were supplied and admixed with the moisturized lean pork chunks to form a second pork chunk admixture which was 60 weight-% lean and 40 weight-% fat.

Usual sausage spices were then added to this second pork chunk admixture to form a spiced pork admixture. Grinding of this spiced pork admixture under usual conditions formed a ground, spiced pork product weighting about 1030 pounds and produced no water run-off from the meat. The ground spiced pork product was placed in collagen sausage casings and the casings bound as usual to form sausage links, with each link weighting about one ounce.

The above prepared sausage links were cooked for 10 minutes at 340°–350° F. with continual rolling of the individual sausage links. The cooked yield weighed about 68% of the uncooked sausage weight (about 700 pounds after cooking). The cooked sausages were straight, showed little if any curvature and air pockets between the casing and meat were not evident.

Ground, spiced pork prepared in the usual manner with the same amount of meat, total water, sodium chloride, sugar and spices yielded about 3% less product after grinding (about 1000 pounds), due primarily to water loss. Sausages prepared from this ground pork averaged a cooked yield of about 62–57% (about 620–570 pounds) of the uncooked sausage weight, were bent after cooking and showed air pockets between the casing and meat.

Thus, the process of this invention produced two increases in yield by reduction of shrinkage at two stages. First, more salable product was produced per pound of starting materials by a reduction in processing shrinkage. Second, more edible product was produced after cooking by a reduction in cooking shrinkage. The difference in cooking shrinkage between the product of this invention and that normally produced (about 80 to about 130 pounds) represents a greater weight differential than that due to the weight of aqueous solution used during processing.

It was also found that sausages prepared from ground pork of this invention were more tender than sausages made with usually prepared ground pork. This effect was noted during normal taste and chewing tests carried out on the products, and by breaking the sausages between the fingers and observing how the sausages snap.

EXAMPLE 2: PRE-COOKED PORK SAUSAGE

In another experiment, a pork sausage of the type which is cooked prior to its sale (pre-cooked) was produced. Here, 1000 pounds (120 pounds and 880 pounds) of 60 weight-% lean—40 weight-% fat pork chunks were treated in a manner analogous to the meat of Example 1, except that an aqueous solution containing 110 pounds of water, 4.2 pounds of salt and about 265 grams of sucrose were used. After grinding, approximately 1110 pounds of ground meat were obtained.

Four thousand pounds of the ground meat were placed into 3.25 inch diameter sausage casings, bound, placed in a smoke house and cooked for four hours at 170° F. after which time an internal temperature of 150° F. was achieved, as is the usual practice. After cooking and cooling to ambient temperature, 3840 pounds (96% yield) of pre-cooked, pork sausage were obtained.

As a control, the process was repeated using the same amount of solution utilized hereinabove except that the solution was not electrolyzed. In this case, it was found that 1000 pounds of pork chunks yielded about 1000 pounds of ground pork. When 4000 pounds of this ground pork were made into pre-cooked sausages as described hereinabove, the cooked product weighed about 3000 pounds. Additionally, the diameters of the pre-cooked products differ, with the pre-cooked sausage of this invention remaining essentially unchanged in diameter while the sausage prepared in the usual manner had its diameter diminished by about 15-25% after the pre-cooking step.

EXAMPLE 3: GROUND BEEF PATTIES

Ground beef patties were prepared from about 5 pounds of chuck blade pot roast which was cut into chunks about 2 inches along the largest dimension. These chunks were then rough ground by passing them through a grinder having ⅜ inch plate openings to form small beef chunks.

An aqueous solution containing 1 pound of salt, 72 grams of sucrose and 25 pounds of water was prepared and had a pH value of 7.8. This solution was divided into two approximately equal portions. One portion was electrolyzed by the passage through it of a direct current of 5 amperes for 5 minutes to yield an electrolyzed solution having a pH value of 8.4. The other portion was used as the control solution.

The rough ground, small chunks of beef were also divided into two approximately equal portions. One portion was combined with the electrolyzed aqueous solution while the pH value of the solution was about 8.4, and the other portion was combined with the control solution to thereby form two admixtures. In both cases, the aqueous solutions were 20 percent by weight of the total admixture weight. The admixtures were agitated until the aqueous solutions were taken-up by the meat forming two batches of moisturized meat chunks.

Each batch of the moisturized meat chunks was then separately ground using a grinding plate having ⅛ inch apertures. The ground beef thus produced was placed in a refrigerator for about 18 hours. The next day, this ground product was made into patties, three from each batch, and the total weight of all of the patties from each batch was determined.

All six patties were cooked together in an electric frying pan at 325° F. for 15 minutes with no additives, such as grease or fat, in the pan. After cooking, the cooked patties were allowed to drain, and were weighed again and the cooked yield and shrink for the patties made by each process were determined.

It was found that the cooked beef patties made in accordance with this invention had a cooked yield of 63.6% or a cooking shrink of 36.4%, while the similarly cooled control beef patties had a cooked yield of 60.1% or a cooking shrink of 39.9%. Thus, beef patties made in accordance with this invention demonstrated a cooking shrink which was about 9% less than the cooking shrink of the control beef patties.

EXAMPLE 4: CURED, SMOKED PORK BUTT

Two pork butts were contacted with aqueous pickle solutions by injecting aqueous pickle solution into each butt and allowing the dripping and exuding pickle to bathe the meat. The aliquots of aqueous pickle solution for each pork butt were taken from the same stock and were thus initially identical. The stock aqueous pickle solution contained 1.15 molal sodium chloride, as well as 7.5% sucrose, 2.8% corn syrup, 0.056% sodium nitrite and a total of 2% of a mixture of sodium tripolyphosphate, sodium pyrophosphate, sodium hexametaphosphate and monosodium phosphate. The initial pH value for this aqueous pickle solution was 10.5.

One 50 pound aliquot of this aqueous pickle solution was placed in a plastic bucket. Using carbon electrodes placed within the aqueous pickle solution as both cathode and anode, a direct current of 5 amperes was passed through the aqueous pickle solution for 5 minutes (66 coulombs per liter) and then throughout the duration of the injection time of about 15 minutes. A total of about 260 coulombs per liter were passed through the solution. The pH of the solution after passage of the current was 10.4.

The fresh pork butts were first weighed (Table 1, below). Then, electrolyzed and non-electrolyzed (control), aqueous pickle solutions were injected into the respective pork butts for equal injecting periods using an aqueous pickle injecting machine built for laboratory purposes, but which approximates the function of production equipment. The pork butts were then re-weighed (Table 1) and cooked by smoking them at 170° F. for 6 hours to an internal temperature of 144° F. After cooling, the cured, smoked pork butts were weighed again (Table 1).

TABLE 1

Pork Butt Shrinkage

| Meat Stage | Pork Butt Weights (oz.) | |
|---|---|---|
| | Injected with Electrolyzed Solution | Injected with Control Solution |
| Fresh | 33.5 | 33.5 |
| Injected | 53 | 44.25 |
| Cooked & Smoked | 33.25 | 25.75 |
| Cooked Yield (based on fresh) | 99.3% | 76.8% |
| Cooking Shrinkage (based on fresh) | 0.7% | 23.2% |

As can be seen from Table 1, above, the cooking shrinkage of the cured, smoked pork butt was reduced dramatically by the curing process of this invention, thereby providing a larger quantity of salable and edible meat.

EXAMPLE 5: CURED AND SMOKED PORK BUTTS PREPARED WITHOUT PHOSPHATE SALTS

An experiment was run using an aqueous pickle solution containing no phosphate salts or other polyvalent pickling or buffering agents. Here, 150 gallons (about 570 liters) of tap water containing about 1.3 molal of sodium chloride was electrolyzed with 4 amperes of direct electric current at 10 volts for 2.75 hours (49,500 coulombs or 87 coulombs per liter) in the reservoir of a meat injecting apparatus using an 8 inch by ¼ inch graphite rod as the cathode and a 2 foot by 2 foot by 1 inch graphite block as the anode. The cathode was placed adjacent the area at which recycled pickle returned to the reservoir and the anode was placed in the area adjacent the reservoir outflow to the injecting needles.

Thereafter, sucrose (201 pounds), corn syrup (113 pounds, solids), sodium nitrite (1.32 pounds) and a small amount of ice to control temperature were admixed and dissolved in the electrolyzed solution to form the electrolyzed, aqueous pickle solution having a volume of 250 gallons (about 950 liters). The direct current was then turned on again at 2 amperes and was left on at this setting for the duration of the experiment.

Fifteen hundred (1500) pounds of fresh pork butts were then injected with the re-electrolyzing, recycling, electrolyzed, aqueous pickle solution. During this injecting period, it was determined that an injection pressure of only 20 p.s.i. was required to inject meat to be cured with an amount of this pickle solution equal to that normally injected with a phosphate salt-containing pickle using a pressure of 40 p.s.i.

The injected pork butts were allowed to cure for two days at a temperature of 35°-40° F. and then stuffed into fibrous casings, as is usual practice in the art. Thereafter, the cured pork butts were smoked at 170° F. for 6 hours until an internal temperature of 144° F. was attained. The yield of the cured, smoked pork butts made by the process of this invention was 1725 pounds, or 115%.

The usual phosphate salt-containing aqueous pickle of Example 4 was used to prepare cured, pork butts by injection with a non-electrolyzed solution. After smoking, as described above, the yield was found to be about 113–117%. Thus, use of the present invention produced an almost identical yield of salable product without the use of phosphate salts or other pickling or buffering agents. In addition, there was no loss in quality of the product by omitting these phosphate salts from the pickle solution, and the color of the cooked product was improved over that usually observed.

EXAMPLE 6: CURING GROUND BEEF WITH ELECTROLYZED, PHOSPHATE SALT-FREE CURING AGENTS

To further demonstrate the utility of the present invention, ground beef was cured for a shortened duration with an electrolyzed, phosphate salt-free pickle solution and the yield compared with the yield obtained for similar ground beef cured under the same conditions using a standard, phosphate salt-containing pork butt pickle (control).

Each of the meats listed in Table 2, below, was ground using a grinding face plate having an aperture of ⅛ inch. Thereafter, 0.5 pound ground beef samples were contacted with 20% by weight of the beef of each of the pickle solutions. This was accomplished by physically admixing the ground beef and pickle solution as intimately as possible. The ground beef and pickle solution were then kept in contact for eighteen hours in a refrigerator to effect a shortened cure, and the free liquid poured off and weighed to determine the cured yield. The cured beef was then made into patties and cooked at 325° F. in an electric frying pan until done without added fats or oils. On cooling to ambient temperature, the patties were weighed to determine the cooked yield. These yield data are listed below in Table 2 as percentages of the fresh, ground beef weight.

TABLE 2

Ground Beef (4) Yield Data (Percent)

| Electrolyzed Phosphate-Free Solution (1) | | Phosphate-Containing Control Solution (2) | |
|---|---|---|---|
| Cured Yield (3) | Cooked Yield (3) | Cured Yield (3) | Cooked Yield (3) |
| 110 | 66.9 | 107.6 | 70.4 |

Notes:
(1) The electrolyzed pickle solution initially contained 7.5% sucrose, 2.8% corn syrup, 0.056% sodium nitrite, 6.4% sodium chloride (1.15 molal) with the remainder being water. A direct electric current was passed through this solution until about 110 coulombs per liter had passed, and the solution was used within about 15 minutes of the cessation of current passage.
(2) The control pickle solution was the standard pork butt pickle solution of Example 4 which contains the above ingredient weights along with about 2% phosphate salts including sodium hexametaphosphate, sodium pyrophosphate, sodium tripolyphosphate and sodium dihydrogen phosphate.
(3) Yield data are based upon the weight of starting meat weights.
(4) Chuck blade pot roast was used.

As can be seen from the above data, ground beef cured according to the present invention and then cooked had comparable cured and cooked yields to the same meat cured by contacting the meat with an equal quantity, by weight, of a standard, phosphate salt-containing pickle solution, thereby demonstrating the efficacy of the process of this invention when the aqueous pickle solution does not contain phosphate salts.

EXAMPLE 7: Pork Butt Yields Using Phosphate Various Pickle Solutions

Yields of cured, cooked and smoked pork butts were determined using four aqueous pickle solutions. Each determination was made using about 20 pounds of pork butts, i.e., ten 2 pound pork butts were used for each determination. Each of the pork butts was injected to about 140–150 percent by weight of its initial, boned or green weight, cured for two days at a temperature of 35°–40° F. stuffed into casings, and then heated and smoked to an internal temperature of 150° F. and maintained at that temperature for one hour. Weight gains were noted in each instance. The data from these determinations are shown in Table 3.

TABLE 3

Cured, Cooked and Smoked Pork Butts Yield Data

| Meat Treating System | Weight of Pickle Pumped (Percent) (1) | Cooked, Smoked Yield (Percent) (2) |
|---|---|---|
| #1 (3) | 150 | 115 |
| #2 (4) | 140 | 108 |
| #3 (5) | 145 | 110 |
| #4 (6) | 148 | 112 |

Notes: (1) Weight percentage of pickle used based upon boned meat weight and including left over pickle, pickle not retained by the meat, and that lost due to spillage.
(2) Weight percentage of boned meat weight.
(3) An electrolyzed pickle solution whose contents were initially similar to those of Note 1 of Example 6 was used. The solution was electrolyzed using 4.5 amperes at less than 5 volts until about 110 coulombs per liter had passed therethrough. Thereafter, the current was maintained at about 4.5 amperes until the pickle solution injection was completed.
(4) A non-electrolyzed pickle solution having the composition of the pickle solution of Note 1 of Example 6 was used.
(5) A non-electrolyzed pickle solution having the composition of the pickle solution of Note 2 of Example 6 was used.
(6) An electrolyzed pickle solution initially having the composition of the pickle solution of Note 2 of Example 6 was used. The solution was electrolyzed using 4.5 amperes at less than 5 volts until about 110 coulombs per liter had passed therethrough. Thereafter, the current was maintained at about 4.5 amperes until the pickle solution injection was completed. The solution was used within 15 minutes of the cessation of current passages.

As can be seen from the above data, those products prepared in accordance with this invention, Systems #1 and #4, had higher yields than the meat products prepared in a manner other than of this invention, Systems #2 and #3.

What is claimed is:

1. A process for preparing meat products with reduced shrinkage comprising the steps of:
providing meat;
providing an aqueous solution containing an edible chloride salt present at a concentration of at least about 0.2 molal;
passing a direct electric current through said aqueous solution to form an electrolyzed solution, said current passing through said solution at about 2 to about 20 amperes until at least about 25 coulombs have passed therethrough per liter of said solution;
combining said meat and said electrolyzed solution to contact said meat with said solution to form an admixture thereof within about 40 minutes after passage of said direct current through said electrolyzed solution has ceased;
maintaining said contact for a time period sufficient for the electrolyzed solution to penetrate said meat and enhance the moisture content thereof to form moisturized meat; and
recovering said moisturized meat.

2. The process of claim 1 wherein said meat is in the form of chunks.

3. The process of claim 2 including the steps of agitating said admixture; and grinding the recovered meat chunks.

4. The process of claim 2 wherein said aqueous solution has a buffering capacity substantially that of tap water saturated with sodium chloride.

5. The process of claim 4 wherein said direct electric current is passed through said aqueous solution for a time sufficient to raise the pH value of the aqueous solution to at least about 8 while forming the electrolyzed solution.

6. The process of claim 5 wherein said meat chunks and the electrolyzed solution are combined while the pH value of said electrolyzed solution is at least about 8.

7. The process of claim 1 wherein said aqueous solution is saturated with said edible chloride salt.

8. The process of claim 1 wherein said direct electric current is passed through said solution until at least about 50 coulombs have passed therethrough per liter of said solution.

9. The process of claim 1 wherein said edible chloride salt is present in a concentration of at least about 0.4 molal.

10. The process of claim 9 wherein said electrolyzed solution and said meat are maintained in contact for a time sufficient to cure said meat.

11. The process of claim 1 wherein said electrolyzed solution is combined with said meat at a temperature of about 100° F. to about 130° F.

12. The process of claim 1 wherein said meat is the flesh of mammals.

13. The process of claim 12 wherein said meat is pork.

14. The process of claim 12 wherein said meat is beef.

15. A process for preparing ground meat comprising the steps of:
providing meat chunks;
providing an aqueous solution containing an edible chloride salt present at a concentration of at least about 0.2 molal;
passing a direct electric current of about 5 to about 15 amperes through said aqueous solution for a time sufficient to raise the pH value of the aqueous solution to at least about 8 while forming an electrolyzed solution;
combining said meat chunks and said electrolyzed solution to form an admixture while the pH value of said electrolyzed solution is at least about 8;
agitating said admixture until at least a portion of said electrolyzed solution is taken-up by said meat chunks to enhance the moisture content thereof and form moisturized meat chunks;
grinding said moisturized meat chunks to form a ground product; and
recovering said ground product.

16. The process of claim 15 wherein said edible chloride salt is sodium chloride and is present in an amount of about 0.1 percent by weight of the total weight of meat provided.

17. The process of claim 15 wherein said edible chloride salt is present in said aqueous solution at a concentration of about 0.25 to about 1.25 molal.

18. The process of claim 15 wherein said edible chloride salt is calcium chloride.

19. The process of claim 15 wherein said direct electric current is passed through said aqueous solution at about 5 to about 10 amperes.

20. The process of claim 15 additionally comprising the steps of supplying and admixing additional meat chunks with said moisturized meat chunks prior to said grinding step to form a second meat chunk admixture, said additional meat chunks containing more fat than said moisturized meat chunks.

21. The process of claim 15 wherein said combining step, said agitating step and said grinding step are performed substantially simultaneously.

22. The process of claim 15 wherein said direct electric current is passed through said aqueous solution until the pH value of the electrolyzed solution is about 8.5 to about 10.5.

23. A process for preparing ground meat comprising the steps of:
   providing a first supply of meat chunks;
   providing an aqueous solution containing sodium chloride at a concentration of about 0.25 molal to about 1.25 molal;
   passing a direct electric current of about 5 to about 10 amperes through said aqueous solution for a time sufficient to produce an electrolyzed solution having a pH value of about 8.5 to about 10.5;
   combining said first supply of meat chunks and said electrolyzed solution to form an admixture while the pH value of said electrolyzed solution is at least about 8.5;
   agitating said admixture until at least a portion of said electrolyzed solution is taken-up by said meat chunks to enhance the moisture content thereof and form moisturized meat chunks;
   providing a second supply of meat chunks containing a higher fat content than said first supply of meat chunks;
   admixing said second supply of meat chunks with said moisturized meat chunks to form a second meat chunk admixture;
   grinding said second meat chunk admixture to form a ground product; and
   recovering said ground product.

24. The process of claim 23 wherein said electrolyzed solution is combined with said meat chunks at a temperature of about 100° F. to about 130° F.

25. The process of claim 23 wherein said meat chunks are the flesh of mammals.

26. The process of claim 25 wherein said meat chunks are pork.

27. The process of claim 25 wherein said meat chunks are beef.

28. The process of claim 23 comprising the additional steps of adding spices to said meat chunks prior to said grinding step, stuffing said ground product into sausage casings, and binding said stuffed casings to form sausages.

29. The process of claim 28 including the further step of at least partially cooking the formed sausages.

30. A process for preparing pork sausages comprising the steps of:
   providing a supply of lean pork chunks;
   providing an aqueous solution containing sodium chloride present in an amount of about 0.1 percent by weight of the total pork provided;
   passing a direct electric current at about 12 to about 18 volts and about 5 to about 10 amperes through said solution for a time period sufficient to produce an electrolyzed solution having a pH value of about 8.5 to about 10.5;
   combining said electrolyzed solution at a temperature of about 100° F. to about 130° F. and said supply of lean pork chunks to form an admixture while said electrolyzed solution has a pH value of at least about 8.5;
   agitating said admixture until at least a portion of said electrolyzed solution is taken-up by said lean pork chunks forming moisturized lean pork chunks;
   providing a second supply of pork chunks containing a higher fat content than said supply of lean pork chunks;
   admixing said second supply of pork chunks with said moisturized lean pork chunks to form a second pork chunk admixture;
   admixing spices with said second pork chunk admixture to form a spiced pork admixture;
   grinding said spiced pork admixture to form a ground, spiced pork product; and
   stuffing said ground, spiced pork product into sausage casings and binding said stuffed casings to form sausages.

31. The process of claim 30 including the further step of at least partially cooking the formed sausages.

32. A process for curing meat comprising the steps of:
   providing an aqueous pickle solution comprising an edible chloride salt present therein at a concentration of at least about 0.4 molal;
   passing a direct electric current of about 2 to about 20 amperes through said aqueous pickle solution to form an electrolyzed, aqueous pickle solution, said current passing therethrough until at least about 25 coulombs have passed through per liter of said solution;
   contacting meat to be cured with said electrolyzed aqueous pickle solution no later than about 40 minutes after said passage of direct current is terminated;
   maintaining said contact for a sufficient time to form cured meat; and
   recovering said cured meat.

33. The process of claim 32 wherein said electrolyzed aqueous pickle solution contains about 0.6 molal to about 1.5 molal edible chloride salt when contacting said meat to be cured.

34. The process of claim 32 wherein said edible chloride salt is sodium chloride.

35. The process of claim 32 wherein at least about 50 coulombs of direct electric current are passed through per liter of said aqueous pickle solution.

36. The process of claim 32 wherein said meat to be cured is contacted with said electrolyzed aqueous pickle solution by injecting said electrolyzed aqueous pickle solution into said meat.

37. The process of claim 32 wherein said meat to be cured is the flesh of mammals.

38. The process of claim 37 wherein said flesh of mammals is pork.

39. The process of claim 37 wherein said flesh of mammals is beef.

40. A process of curing meat comprising the steps of:
   providing an aqueous pickle solution comprising sodium chloride present therein at about 0.6 molal to about 1.5 molal;
   passing at least about 50 coulombs of direct electric current of about 2 to about 20 amperes per liter of said aqueous pickle solution therethrough to form an electrolyzed, aqueous pickle solution; and
   contacting meat to be cured with said electrolyzed aqueous pickle solution by injecting at least a portion of said electrolyzed aqueous pickle solution into said meat, said contacting being carried out within about 40 minutes after passage of said current through said electrolyzed aqueous pickle solution is terminated;
   maintaining said contact for a sufficient time to form cured meat; and recovering said cured meat.

41. The process of claim 40 wherein an excess of said electrolyzed, aqueous pickle solution is injected into said meat, subsequently recovered, and then recycled for injection into said meat.

42. The process of claim 40 wherein further direct current is passed through said electrolyzed aqueous pickle solution at about 0.5 to about 2 amperes until said electrolyzed pickle solution is injected.

43. The process of claim 40 wherein said aqueous pickle solution has a buffering capacity substantially that of tap water saturated with sodium chloride.

44. The process of claim 43 wherein the pH value of said electrolyzed, aqueous pickle solution, when injected, is at least about 8.

45. The process of claim 44 wherein the pH value of said electrolyzed aqueous pickle solution, when injected, is about 8.5 to about 10.5.

46. The process of claim 40 wherein said meat to be cured and said electrolyzed, aqueous pickle solution are contacted within about 15 minutes after termination of direct current passage.

47. The process of claim 40 wherein said meat to be cured and said electrolyzed, aqueous pickle solution are contacted within about 5 minutes after termination of direct current passage.

48. A process of curing pork to reduce shrinkage comprising the steps of:
    providing an aqueous pickle solution containing sodium chloride present at about 0.6 molal to about 1.5 molal;
    passing through said aqueous pickle solution a direct electric current of about 3 to about 8 amperes for a time period sufficient to pass at least about 50 coulombs of direct electric current therethrough per liter of said aqueous pickle solution and form an electrolyzed, aqueous pickle solution; and
    contacting pork to be cured with said electrolyzed aqueous pickle solution by injecting said electrolyzed aqueous pickle solution into said pork through a plurality of hollow needles, said contacting taking place within about 15 minutes after termination of said direct current passage;
    maintaining said contact for a sufficient time to cure said pork; and
    recovering said cured pork.

* * * * *